Patented June 13, 1950

2,511,427

UNITED STATES PATENT OFFICE 2,511,427

STABILIZED OLEAGINOUS MATERIALS

Loran Oid Buxton, Maplewood, and Charles Early Dryden, East Orange, N. J., assignors to Nopco Chemical Company, Harrison, N. J., a corporation of New Jersey No Drawing. Application May 27, 1947, Serial No. 750,892

11 Claims. (Cl. 167—81)

The present invention relates to the stabilization of oleaginous materials. More particularly, the present invention relates to antioxidant stabilized oleaginous materials such as animal and vegetable fats and oils which are normally subject to oxidative deterioration and a process for preparing the same.

The particular class of substances to which the present invention is especially applicable are the marine oils such as those extracted from fish livers and the like containing vitamins A and D, and which are particularly subject to oxidation whereby the vitamin A and D content thereof is decreased. However, the present process may be applied to other materials of a similar nature such as fatty oils, fats, soaps, vitamin concentrates, etc. Thus, oils and fats of animal and vegetable origin such as cod liver oil, as well as vitamin concentrates or vitamin containing fractions obtained from such oils; corn oil, cottonseed oil, soyabean oil, and other vegetable oils; fats such as butter, margarine, lard, hydrogenated shortenings, palm oil, etc.; soaps of higher fatty acids; and compositions containing such fatty materials as essential ingredients, as, for example, cookies, cakes, crackers, breakfast cereals, etc. as well as food emulsions such as mayonnaise may all be suitablly stabilized in accordance with this invention. Furthermore, substances such as sulfonated oils and other sulfonated fatty compounds, amides, mono- and diglycerides and other fatty acids which tend to become rancid upon exposure to air may be treated in accordance with the present invention and are included within the term "oleaginous materials." Also included are other materials composed largely of oils, fats and the like subject to change on oxidation, i. e., cosmetics such as face creams, hand lotions, shave creams, etc.

It has been previously proposed to add to materials of this general character, and particularly to fish oils and the like, a relatively small percentage of phosphatides or phopholipins, such as lecithin, cephalin, cuorin, sphingomyelin, etc. It has been discovered, however, that phosphatides in themselves are not particularly good antioxidants for materials of the character set forth.

It has also been suggested in the prior art to add, in addition to phosphatides, other well known antioxidants which possess a synergistic action with the phosphatide. Such other antioxidants are tocopherols, hydroquinone, para amino phenol, and 4-tertiary butyl catechol.

In general, the type of compounds which exert a synergistic action in combination with phosphatides are of the cyclic oxy types, as for example, quinones, hydroquinones, naphthoquinones, naphthols, naphthohydroquinones, chromans, chromens, coumarones, and coumarans.

The quinone type of compounds comprises the naphthols, quinones and quinols, including the alpha-naphthols, such as 2-methyl-1-naphthol, 3 - methyl - 1 - naphthol, the alpha - naphthoquinones, the alpha-naphthohydroquinones, the alkyl-substituted naphthohydroquinones, such as 2-methyl-1,4-naphthohydroquinone, the benzoquinones and corresponding quinols, such as p-xyloquinone, p-xylohydroquinone, the beta-naphthoquinones, the lapachones, such as beta-lapachone and dehydroiso-beta-lapachone.

The chroman type compounds comprise the class of chromans including the hydroxychromans, such as the 6-hydroxy-chromans, the alpha-beta-gamma-tocopherols, and the alkyltocols, such as 5,7-dimethyltocol; the chromens, such as the 6-hydroxychromens and alkyl-substituted compounds, i. e., 6-hydroxy-2,2,4 trimethyl chromen, the coumarones including the hydroxycoumarones, such as the 5-hydroxycoumarones and alkyl-substituted compounds such as 5-hydroxy-2,4,6,7 tetramethyl coumarone, the coumarans including the hydroxycoumarans, such as the 5-hydroxycoumarans and alykyl-substituted compounds, i. e., 5-hydroxy 2,4,6,7-tetramethyl coumaran, and the isocoumaranones and hydroxyisocoumaranones and aromatic and alkyl substituted compounds, such as the 5- and 7-hydroxyisocoumaranones, 3-phenyl isocoumaranone, 5-hydroxy- 4,6,7 trimethyl isocoumaranone, 5-hydroxy-3-phenyl isocqumaranone, and 7-hydroxy 3-phenyl isocoumaranone, and the chroman-5,6-quinones and their precursors which are associated with vitamin E.

All of the compounds noted in the previous two paragraphs are cyclic oxy compounds and thus are similar. In combination with these materials, phosphatides such as lecithin exert a marked antioxidant effect which is much greater than that of the other well known antioxidants in themselves.

We have now discovered that if a phosphatide such as lecithin is treated with a relatively small amount of ammonium hydroxide, there is produced a remarkably effective antioxidant for various types of fatty materials normally prone to oxidation. Furthermore, the ammonia treated phosphatide is far more effective than an untreated phosphatide either alone or in combination with the other antioxidants just previously set forth. In accordance with the process of the present invention, stabilized oleaginous materials may be prepared by treating a phosphatide with ammonia to produce a superior antioxidant and thereafter adding this antioxidant in relatively small amounts, as, for example, from about ½% to about 5%, to the oleaginous material to be stabilized. Preferably, however, we prepare the stabilized oleaginous materials of the invention by adding to an oleaginous material a small percentage, as for example, from about ½% to about 5% of a suitable phosphatide and thereafter treating the mixture of oleaginous material and phosphatide with concentrated aqueous ammonium hydroxide.

In United States Patent No. 2,295,179 there is disclosed a process for treating phosphatides which are to be used as addition agents for lubricating oils. As is pointed out in that patent, phosphatides, and particularly the commercially available forms of the phosphatides, e. g., commercial lecithin, comprise a mixture of lecithin, cephalin, residual fatty oil, and free fatty acids. It is pointed out in that patent that although the addition of phosphatides to lubricating oils improves the quality of the oils in certain respects, such addition of the phosphatides to lubricating oils causes other undesirable properties to appear in the oils. As is pointed out in the patent, such adverse effects are apparently caused by the acidic properties of the phosphatides or of the fatty oils occurring in the commercial mixture of phosphatides. The patentee states that such adverse effects may be prevented by the simple expedient of merely neutralizing the phosphatide material either before or after adding it to the lubricating oil. His preferred neutralizing agents are alkyl and aromatic amines. He states, however, that ammonia or ammonium hydroxide may be used to neutralize the acidic phosphatide material if desired. Thus mere neutralization of the acidic phosphatides prevents the corrosion of metal alloy bearing surfaces and minimizes early sludge formation in the lubricating oil, whereas when an acidic phosphatide material is added to a lubricating oil both of these adverse effects occur.

The process of the present invention is far different from that disclosed in United States Patent No. 2,295,179 as will be fully demonstrated hereinafter in the examples and in the description of the present process. At this point it will suffice to say that the acidity of the phosphatides treated in the present process is as great or in some cases even greater after they have been treated in accordance with the process of the invention than was the case before such treatment was carried out.

It is an object of this invention to provide an improved method and manner of increasing the stability of oleaginous materials.

A further object of the invention is to provide fat-soluble vitamin products of increased stability.

Other advantages and objects of the present invention will be apparent from the subsequent description and claims.

In accordance with the preferred form of the present invention, the oleaginous material, for example, fish liver oil, is combined with a suitable phosphatide, as for example, lecithin, and a solvent in which the fish liver oil and/or the phosphatide is at least partially soluble, and a small quantity of concentrated aqueous ammonia solution. Thereafter, the mixture is heated at about reflux temperature for approximately an hour, although longer periods such as 3 to 5 hours may be resorted to. Then the solvent, free and fatty acid combined ammonia, and water are removed from the treated material, e. g. by vacuum distillation.

It is to be noted that it is in general desirable to dissolve the oleaginous material such as fish liver oil at least partially in a suitable solvent therefor. Thus, the fish liver oil may be dissolved in a hydrocarbon or halogenated hydrocarbon solvent, such as hexane, heptane, octane, ethylene dichloride, trichlorethylene, carbon tetrachloride, cyclohexane, methyl cyclohexane, or benzene. Other types of solvents which may be used are the lower molecular weight alcohols, such as methanol, ethanol, propanol, isopropanol, etc. A particularly desirable solvent for use in the present process is acetone.

Preferably, although not necessarily, the amount of solvent used should be at least equivalent to, and in some cases, in excess of, the amount of oil being treated. Mixtures of the aforementioned solvents, such as a mixture of methanol and acetone, and mixtures of other suitable solvents may also be used. The fact that better results are obtained by utilizing solvents in the present process is especially noteworthy where the lecithin or other phosphatide is treated with ammonia before being added to the oleaginous material to be stabilized. Thus, one of the most desirable solvents for this purpose is acetone which is not ordinarily considered a solvent for phosphatide material. However, for some reason, when phosphatide materials such as lecithin are treated with ammonia, better results are obtained when a solvent, such as acetone, which only partially dissolves the lecithin is used; and where, in the claims and description, the term "solvent" is used, it is to be understood that solvents are included in which phosphatides, for example, lecithin, are only partially soluble, e. g. acetone and/or methanol.

In general, it is more desirable that the phosphatide be first added to the oil or oleaginous material to be stabilized and thereafter the mixture treated with ammonia. Just why better results are obtained by first adding the phosphatide to the oil is not known. Thus, better results are obtained even when the oil itself is a thoroughly refined marine oil which contains no constituents capable of being activated by ammonia treatment.

For a fuller understanding of the nature and objects of the invention, reference may be had to the following examples which are merely illustrative and are not to be construed in a limiting sense.

EXAMPLE I

A carbon-refined shark liver oil was allowed to stand exposed to the atmosphere at 34.5° C. for a period of 6 days. At the end of this time, it was found that approximately 47% of the vitamin A content thereof had been destroyed.

EXAMPLE II

To the carbon-refined shark liver oil of Example I, 1% corn oil phosphatide was added and a sample of the mixed phosphatide and oil allowed to stand exposed to the atmosphere at 34.5° C. for a period of 6 days. Approximately 48-49% of the vitamin A content thereof was destroyed. It is to be noted that the addition of the corn oil phosphatide to the oil of Example I did not increase the ability of the oil to withstand oxidation.

EXAMPLE III

A mixture of 10 grams of commercial soybean lecithin having a free fatty acid content of 3.7%, 190 ml. of acetone, and 10 ml. of concentrated ammonium hydroxide was refluxed for 1 hour; a portion of the lecithin dissolved in the acetone. Thereafter, the mixture was freed of solvent by heating under reduced pressure, i. e., a pressure of about 15 mm., whereby the free and fatty acid combined ammonia, and water were also removed. The activated lecithin had a free fatty acid content of 3.85%. Two percent of the activated lecithin was then added to a carbon-refined shark liver oil and the mixture allowed to stand exposed to the atmosphere at 34.5° C. The results are indicated under III in Table I.

EXAMPLE IV

A solution of 10 grams of commercial soybean lecithin having a free fatty acid content of 3.7% in 190 ml. of petroleum ether and 10 ml. of concentrated ammonium hydroxide was refluxed for one hour and thereafter the solvent, free and fatty acid combined ammonia, and water were removed as set forth in Example III. The activated lecithin had a free fatty acid content of 3.7%. Two percent of the activated lecithin was then added to carbon-refined shark liver oil, and the mixture allowed to stand at 34.5° C. exposed to the atmosphere. The results are indicated under IV in Table I.

EXAMPLE V

A mixture of 10 grams of commercial soybean lecithin having a free fatty acid content of 3.7%, 90 ml. of acetone, 90 ml. of methanol and 20 ml. of ammonium hydroxide was treated as in Example IV. The activated lecithin had a free fatty acid content of 3.75%. The resultant activated lecithin was added to shark liver oil as in Example IV. The results are indicated at V in Table I.

EXAMPLE VI

A solution of 10 grams of commercial soybean lecithin having a free fatty acid content of 3.7% in 90 ml. of petroleum ether, 90 ml. of acetone and 20 ml. of ammonium hydroxide was treated as in the previous examples. The activated lecithin had a free fatty acid content of 3.9%. Refined shark liver oil was stabilized with the resulting activated lecithin and the stability of the oil determined as before. The results are indicated at VI in Table I.

EXAMPLE VII

A solution of 10 grams of commercial soybean lecithin and 100 ml. of petroleum ether, 90 ml. of methanol and 10 ml. of ammonium hydroxide was treated as in the previous examples. Stability data on refined shark liver oil stabilized with the resulting activated lecithin are indicated at VII in Table I.

EXAMPLE VIII

A mixture of 10 grams of commercial soybean lecithin, 180 ml. of acetone and 20 ml. of ammonium hydroxide was treated as in the previous examples and the activated lecithin similarly added to carbon refined shark liver oil. The results of stability tests are indicated at VIII in Table I.

EXAMPLE IX

A solution of 10 grams of corn oil phosphatide in 90 ml. of petroleum ether, 90 ml. of acetone and 20 ml. of ammonium hydroxide was treated similarly to the previous examples and the activated phosphatide similarly added to carbon refined shark liver oil. The results of stability tests are indicated at IX in Table I.

EXAMPLE X

A mixture of 10 grams of commercial soybean lecithin, 40 ml. of 99% isopropanol and ½% ammonium hydroxide (based on lecithin weight) was treated similarly to the previous examples and the treated lecithin added to refined shark liver oil and similarly tested. Stability data are indicated at X in Table I.

EXAMPLE XI

The experiment of Example X was repeated, except that 1% ammonium hydroxide, based on the lecithin weight, was used instead of ½%. The stability results are indicated at XI in Table I.

EXAMPLE XII

The experiments of Examples X and XI were repeated, except that 5% of ammonium hydroxide based on the lecithin weight was used instead of ½ or 1%. The stability results are indicated at XII in Table I.

EXAMPLE XIII

The experiment of Example X was repeated, except that the mixture was heated at reflux temperature for three hours rather than one hour. The stability results are indicated at XIII in Table I.

EXAMPLE XIV

The experiment of Example X was repeated, except that the mixture was heated at reflux temperature for five hours rather than 1 hour. The stability results are indicated at XIV in Table I.

EXAMPLE XV

Twenty-five grams of carbon-refined shark liver oil were admixed with two percent of commercial soybean lecithin. The resulting mixture which had a free fatty acid content of 2.0% was mixed with 65 ml. of acetone and 5% of ammonium hydroxide based on the weight of the oil. The mixture was then heated at reflux temperature for three hours. The solvent, free and fatty acid combined ammonia, and water were then removed as previously set forth in the other examples. The stabilized shark liver oil had a free fatty acid content of 1.97%. The thus stabilized shark liver oil was tested at 34.5° C. as in the previous examples. The results are set forth at XV in Table II.

EXAMPLE XVI

The experiment of Example XV was repeated except that 65 ml. of ethylene dichloride were used instead of acetone. The free fatty acid content of the stabilized oil was 1.85%. The stability results are set forth at XVI in Table II.

EXAMPLE XVII

The experiment of Example XV was repeated, except that 65 ml. of cyclohexane were used instead of acetone. The free fatty acid content of the stabilized oil was 1.95%. The stability results are set forth at XVII in Table II.

EXAMPLE XVIII

The experiment of Example XV was repeated, except that 65 ml. of isopropanol were used instead of acetone. The free fatty acid content of the stabilized oil was 1.93%. The stability results are set forth at XVIII in Table II.

EXAMPLE XIX

A mixture of 30 grams of carbon-refined shark liver oil containing dissolved therein two percent of commercial soybean lecithin, 30 ml. 99% isopropanol, and ½% of ammonium hydroxide was refluxed for one hour. The solvent, free and fatty acid combined ammonia, and water were then removed as previously set forth in the other examples. The resultant stabilized shark liver oil was allowed to stand exposed to the atmosphere at 34.5° C. and results were obtained as indicated at XIX in Table II.

EXAMPLE XX

The experiment of Example XIX was repeated, except that one percent of soybean lecithin and one percent of ammonium hydroxide, both based on oil weight, were used. The results are those indicated at XX in Table II.

EXAMPLE XXI

The experiment of Example XX was repeated, except that ½% soybean lecithin rather than 1% was used. The results are indicated at XXI in Table II.

EXAMPLE XXII

The experiment of Example XIX was repeated, except that 5% of ammonium hydroxide based on oil weight was used rather than ½%. The results are indicated at XXII in Table II.

EXAMPLE XXIII

The experiment of Example XX was repeated, except that 5% of ammonium hydroxide based on oil weight was used instead of 1%. The results are indicated at XXIII in Table II.

EXAMPLE XXIV

The experiment of Example XXI was repeated, except that 5% ammonium hydroxide based on oil weight was used instead of 1%. The results are indicated at XXIV in Table II.

EXAMPLE XXV

A mixture of 25 grams of carbon-refined shark liver oil containing dissolved therein ½% of commercial soybean lecithin and ½% of concentrated ammonium hydroxide (both based on oil weight) was heated to a temperature of about 70° C. for one hour. The oil was then dried by adding thereto a small amount of 99% isopropanol and thereafter removing the free and fatty acid combined ammonia, water, and isopropanol by vacuum distillation, i. e. under a pressure of about 15 mm. The resultant stabilized shark liver oil was exposed to the atmosphere at 34.5° C. with the results indicated at XXV in Table II.

EXAMPLE XXVI

The experiment of Example XXV was repeated, except that 1% of ammonium hydroxide based on oil weight was used instead of ½%. The results are indicated at XXVI in Table II.

EXAMPLE XXVII

The experiment of Example XXV was repeated, except that 5% of ammonium hydroxide based on oil weight was used instead of ½%. The results are indicated at XXVII in Table II.

EXAMPLE XXVIII

The experiment of Example XXV was repeated, except that 1% of lecithin was used instead of ½%. The results are indicated at XXVIII in Table II.

EXAMPLE XXIX

The experiment of Example XXVI was repeated, except that 1% of lecithin was used instead of ½%. The results are indicated at XXIX in Table II.

EXAMPLE XXX

The experiment of Example XXVII was repeated, except that 1% of lecithin was used instead of ½%. The results are indicated at XXX in Table II.

The following tables show in a comparative manner the use of different solvents and various quantities of ammonia in activating phosphatides. The experiments summarized in Table I are those in which the phosphatide was previously treated with ammonia and thereafter added to the fish liver oil, whereas the experiments of Table II are those in which the phosphatide and fish liver oil were first admixed and thereafter treated with ammonium hydroxide. It is desired to point out that in every instance where reflux conditions are mentioned in the above examples and in the tables the temperature of treatment was approximately 40° C. to 85° C. depending on the solvent used.

TABLE I

*Phosphatide+solvent treated with concentrated ammonium hydroxide and then added to fish liver oil*

[Carbon refined shark liver oil]

| Examples | Phosphatide Added | Per Cent of Ammonia (conc'd. NH₄OH/ Phosphatide) | Time of Treatment, hours | Solvent Used | Per Cent Vitamin A Destruction at 34.5° C. After— | | |
|---|---|---|---|---|---|---|---|
| | | | | | 6 days | 14 days | 20 days |
| I | | | | | 47 | | |
| II | 1% corn oil phosphatide | | | | 48–49 | | |
| III | 2% lecithin treated with | 100 | 1 | Acetone | 5.95 | 14.4 | 23.6 |
| IV | do | 100 | 1 | Petroleum ether | 0 | 16.4 | 27.4 |
| V | do | 200 | 1 | Acetone+Methanol | 7.15 | 18.6 | 28.6 |
| VI | do | 200 | 1 | Acetone+Petroleum ether | 8.5 | 20.0 | 31.4 |
| VII | do | 100 | 1 | Petroleum ether+Methanol | 7.3 | 18.0 | 25.9 |
| VIII | do | 200 | 1 | Acetone | 7.85 | 17.0 | 27.6 |
| IX | 2% corn phos. treated with | 200 | 1 | Petroleum ether+Acetone | 4.95 | 18.5 | 28.0 |
| X | 2% lecithin treated with | ½ | 1 | Isopropanol | 12.7 | 32.4 | |
| XI | do | 1 | 1 | do | 9.34 | 26.8 | |
| XII | do | 5 | 1 | do | 10.8 | 28 | |
| XIII | do | ½ | 3 | do | 11.25 | 29.6 | |
| XIV | do | ½ | 5 | do | 8.7 | 26.8 | |

TABLE II

*Fish liver oil+phosphatide+solvent then treated with $NH_4OH$*

[Carbon refined fish liver oil]

| Examples | Phosphatide Added/fish liver oil, per cent | Per cent of Ammonia (conc'd $NH_4OH$/fish liver oil) | Time of Treatment, hours | Solvent Used | Per cent Vitamin A Destruction at 34.5° C. After— | | | |
|---|---|---|---|---|---|---|---|---|
| | | | | | 6 days | 14 days | 20 days | 27 days |
| X | 2% soybean lecithin | 5 | 3 | Acetone | 0.9 | 5.49 | 7.3 | 7.65 |
| XVI | ---do--- | 5 | 3 | Ethylene Dichloride | 0 | 3.74 | 9.13 | 17.5 |
| XVII | ---do--- | 5 | 3 | Cyclohexane | 0 | 2.84 | 8.5 | 17.4 |
| XVIII | ---do--- | 5 | 3 | Isopropanol | 1.15 | 4.10 | 8.94 | 18.0 |
| XIX | ---do--- | ½ | 1 | ---do--- | 2.3 | 8.5 | 25.5 | |
| XX | 1% soybean lecithin | 1 | 1 | ---do--- | 4.32 | 16.0 | 29.8 | |
| XXI | ½% soybean lecithin | 1 | 1 | ---do--- | 2.86 | 18.75 | 38.4 | |
| XXII | 2% soybean lecithin | 5 | 1 | ---do--- | 2.85 | 6.06 | 11.9 | 26.0 |
| XXIII | 1% soybean lecithin | 5 | 1 | ---do--- | 1.81 | 2.89 | 12.45 | 28.0 |
| XXIV | ½% soybean lecithin | 5 | 1 | ---do--- | 2.67 | 15.3 | 30.7 | |
| XXV | ---do--- | ½ | 1 | none | 2.7 | 10.9 | | 54.3 |
| XXVI | ---do--- | 1 | 1 | ---do--- | 3.16 | 9.14 | | 42.3 |
| XXVII | ---do--- | 5 | 1 | ---do--- | 3.5 | 16.3 | | 56.4 |
| XXVIII | 1% soybean lecithin | ½ | 1 | ---do--- | 1.4 | 11.7 | | 45.6 |
| XXIX | ---do--- | 1 | 1 | ---do--- | 2.78 | 8.7 | | 37.4 |
| XXX | ---do--- | 5 | 1 | ---do--- | 6.6 | 20.7 | | 42.7 |

It will be noted from the above tables that as compared to the original refined shark liver oil, and the sample of refined shark liver oil to which phosphatide had been added (see I and II, Table I), the oil in every instance showed a very much greater increase in stability as typified by a lower amount of vitamin A destroyed.

In general, the best results as indicated were obtained when the solvent used was acetone, although other solvents and mixtures of solvents gave enhanced stability. It is apparent that the quantity of phosphatide added to the oil should be at least about ½%, as, at this proportion, lower stability begins to occur. In general, the upper limits of phosphatide addition are determined by the solubility of the phosphatide in the oil, which is approximately 5%. In the event, however, that a product other than a clear oil is desired, this limit may be exceeded, although no particularly better results from the stability standpoint are achieved. The quantity of ammonia used does not appear to be critical. In this connection, the results obtained when as much as 200% of ammonia was used, and the results obtained when ½% of ammonia was used are to be noted. In general, it is to be noted that the greater quantity of ammonia resulted in a somewhat better antioxidant, but the increase was not particularly marked.

It will be noted in referring to Table II that when the fish liver oil was combined with the phosphatide, greater amounts of ammonia did not greatly increase the stability of the fish liver oil although, in general, stability was slightly greater when 5% of ammonia was used as compared to when ½% of ammonia was used. These quantities of ammonia were relatively large as compared to the amount of soybean lecithin, as they were based on the quantity of fish liver oil. In general, it may be stated that the amount of ammonia used should be approximately equal or somewhat greater than the amount of phosphatide, and this is true whether or not the phosphatide is first added to the fish liver oil or first treated with ammonia and then added to the fish liver oil.

It is to be noted that other forms of ammonia rather than concentrated aqueous ammonium hydroxide solution may be used, and that when the term "ammonia" is referred to in the claims, concentrated aqueous ammonium hydroxide solution, liquid ammonia and/or gaseous ammonia is intended to be denoted thereby.

As has been pointed out hereinabove, phosphatides and particularly lecithin as obtained commercially comprise a mixture of lecithin, cephalin, residual fatty oil and free fatty acids. Due to the latter constituent, commercial lecithin is characterized by having an acid value of at least 5 and ranging up to 10 or more. For example, see Examples III, IV, V, and VI hereinabove where the commercial lecithin employed had a free fatty acid content of 3.7%. As is well known the acid value of a fatty material is approximately twice the numerical value of the per cent of free fatty acids in such a material. Thus the acid value of this commercial lecithin was approximately 7.4. In the process of the present invention as specifically illustrated by the several specific examples set forth above, the positive acid value of the phosphatide commenced with is substantially the same as that of the ammonia treated phosphatide. In view of the foregoing facts, it is apparent that if ammonium soaps are formed with the free fatty acids present in the commercial lecithin at any time in the process, such soaps are split or decomposed during the steps of removing the water and excess ammonia. In other words, in the final step wherein the removal of the excess of free ammonia, water and/or solvent is effected by distillation, the fatty acid combined ammonia is also removed as a consequence of splitting or decomposing what ammonium soaps may have been formed. Thus it is quite apparent that phosphatide products produced in accordance with the process of our invention are entirely different from the neutralized phosphatides produced by the process of United States Patent No. 2,295,179. It is also interesting to note that although quite small amounts of ammonia, e. g., ½% in Examples X, XIII, XIV, and XIX, gave excellent results in increasing the antioxidant effect of phosphatides, such small amounts of ammonia were not sufficient to neutralize the amounts of commercial phosphatides employed in those examples. This further illustrates the difference between our products and those of Patent No. 2,295,179. Also, as has previously been pointed out, all of the fatty acid combined ammonia used in our process is removed from the phosphatide in the final step of the process.

This application is a continuation-in-part of our copending application Serial No. 528,354, filed March 27, 1944, now abandoned.

The process of preparing the improved antioxidants as such and the improved antioxidants as new compositions of matter are claimed in our copending application Serial No. 750,893, filed concurrently herewith.

Having described our invention, what we claim as new and desire to secure by Letters Patent is:

1. A process for the stabilization of fatty materials which comprises admixing a relatively small quantity of a phosphatide with a fatty material, heating the mixture in contact with ammonia, and subsequently removing from the mixture the free ammonia which is admixed therewith, the ammonia combined with fatty acids in the mixture and any water which is present in the mixture, said removal of the ammonia and the water being accomplished by heating the mixture under reduced pressure until the ammonium soaps therein are split into free ammonia and free fatty acids and the ammonia is removed from the mixture leaving the free fatty acids in the mixture.

2. A process for the stabilization of fatty materials which comprises heating a fat-solvent solution of a mixture of a fatty material and a relatively small quantity of a phosphatide in contact with ammonia, said heating in contact with the ammonia being carried out at about the reflux temperature of the solvent, and subsequently removing from the mixture the free ammonia which is admixed therewith, the ammonia combined with fatty acids in the mixture, the solvent and any water present in the mixture, said removal of the ammonia, the solvent and the water being accomplished by heating the mixture under reduced pressure until the ammonium soaps therein are split into free ammonia and free fatty acids and the ammonia is removed from the mixture leaving the free fatty acids in the mixture.

3. A process for the stabilization of a fat-soluble vitamin-containing oil which comprises heating a fat-solvent solution of a mixture of a fat-soluble vitamin-containing oil and a relatively small quantity of a phosphatide in contact with ammonia, said heating in contact with the ammonia being carried out at about the reflux temperature of the solvent, and subsequently removing from the mixture the free ammonia which is admixed therewith, the ammonia combined with fatty acids in the mixture, the solvent and any water present in the mixture, said removal of the ammonia, the solvent and the water being accomplished by heating the mixture under reduced pressure until the ammonium soaps therein are split into free ammonia and free fatty acids and the ammonia is removed from the mixture leaving the free fatty acids in the mixture.

4. A process for the stabilization of a fat-soluble vitamin-containing oil which comprises heating a mixture of a fat-soluble vitamin-containing oil, a relatively small quantity of a phosphatide, acetone and ammonia, said heating being carried out at about the reflux temperature of the acetone, and subsequently removing from the mixture the free ammonia which is admixed therewith, the ammonia combined with fatty acids in the mixture, any water which is present in the mixture and the acetone, said removal of the ammonia, the water and the acetone being accomplished by heating the mixture under reduced pressure until the ammonium soaps therein are split into free ammonia and free fatty acids and the ammonia is removed from the mixture leaving the free fatty acids in the mixture.

5. A process for the stabilization of a fat-soluble vitamin-containing oil which comprises heating a mixture of a fat-soluble vitamin-containing oil, a relatively small quantity of commercial lecithin, acetone and ammonia, said heating being carried out at about the reflux temperature of the acetone, and subsequently removing from the mixture the free ammonia which is admixed therewith, the ammonia combined with fatty acids in the mixture, any water which is present in the mixture and the acetone, said removal of the ammonia, the water and the acetone being accomplished by heating the mixture under reduced pressure until the ammonium soaps therein are split into free ammonia and free fatty acids and the ammonia is removed from the mixture leaving the free fatty acids in the mixture.

6. A fatty material stabilized against oxidation prepared by heating a mixture of the fatty material and a relatively small quantity of a phosphatide in contact with ammonia, and subsequently removing from the mixture the free ammonia which is admixed therewith, the ammonia combined with fatty acids in the mixture and any water which is present in the mixture, said removal of the ammonia and the water being accomplished by heating the mixture under reduced pressure until the ammonium soaps therein are split into free ammonia and free fatty acids and the ammonia is removed from the mixture leaving the free fatty acids in the mixture.

7. A fatty material stabilized against oxidation prepared by heating a fat-solvent solution of a mixture of the fatty material and a relatively small quantity of a phosphatide in contact with ammonia, said heating in contact with the ammonia being carried out at about the reflux temperature of the solvent, and subsequently removing from the mixture the free ammonia which is admixed therewith, the ammonia combined with fatty acids in the mixture, the solvent and any water present in the mixture, said removal of the ammonia, the solvent and the water being accomplished by heating the mixture under reduced pressure until the ammonium soaps therein are split into free ammonia and free fatty acids and the ammonia is removed from the mixture leaving the free fatty acids in the mixture.

8. A fatty material stabilized against oxidation prepared by heating in contact with ammonia an acetone solution of a mixture of the fatty material and a relatively small quantity of a phosphatide, said heating being at about the reflux temperature of the acetone, and thereafter removing from the mixture of the fatty material and phosphatide the free ammonia which is admixed therewith, the ammonia combined with fatty acids in the mixture, the acetone and any water which is present in the mixture, said removal of the ammonia, the acetone and the water being accomplished by heating the mixture under reduced pressure until the ammonium soaps therein are split into free ammonia and free fatty acids and the ammonia is removed from the mixture leaving the free fatty acids in the mixture.

9. A stabilized vitamin-containing oil of marine origin prepared by admixing with the oil from about 0.5% to about 5.0% of commercial lecithin based on the weight of the oil, heating the mixture in contact wtih concentrated ammonium hydroxide, and thereafter removing from the mixture the free ammonia which is admixed therewith, the ammonia combined with fatty acids in the mixture and any water which is present in the mixture, said removal of the ammonia and the water being accomplished by heating the mixture under reduced pressure until the ammonium soaps therein are split into free ammonia and free fatty acids and the ammonia is removed from the mixture leaving the free fatty acids in the mixture.

10. A stabilized vitamin-containing oil of marine origin prepared by admixing with the oil from about 0.5% to about 5.0% of commercial lecithin based on the weight of the oil, admixing this mixture with a fat solvent, heating the fat-solvent solution of the mixture in contact with concentrated ammonium hydroxide, said heating being at about the reflux temperature of the solvent, and then removing from the mixture the solvent, the free ammonia which is admixed therewith, the ammonia combined with fatty acids in the mixture and any water which is present in the mixture, said removal of the solvent, the ammonia and the water being accomplished by heating the mixture under reduced pressure until the ammonium soaps therein are split into free ammonia and free fatty acids and the ammonia is removed from the mixture leaving the free fatty acids in the mixture.

11. A stabilized vitamin-containing oil of marine origin prepared by admixing with the oil from about 0.5% to about 5.0% of commercial lecithin based on the weight of the oil, admixing this mixture with acetone, heating the acetone solution of the mixture in contact with concentrated ammonium hydroxide, said heating being at about the reflux temperature of the acetone, and then removing from the mixture the acetone, the free ammonia which is admixed therewith, the ammonia combined with fatty acids in the mixture and any water which is present in the mixture, said removal of the acetone, the ammonia and the water being accomplished by heating the mixture under reduced pressure until the ammonium soaps therein are split into free ammonia and free fatty acids and the ammonia is removed from the mixture leaving the free fatty acids in the mixture.

LORAN OID BUXTON.
CHARLES EARLY DRYDEN.

REFERENCES CITED

The following references are of record in the file of this patent:

UNITED STATES PATENTS

| Number | Name | Date |
|---|---|---|
| 2,051,257 | Holmes | Aug. 18, 1926 |
| 2,295,179 | Loane | Sept. 8, 1942 |
| 2,410,455 | Musher | Nov. 5, 1946 |

OTHER REFERENCES

Cady et al.: Journal of Biological Chemistry (1930), page 749. (Copy in Scientific Library.)